United States

Hicks, Jr.

3,779,729

Dec. 18, 1973

[54] METHOD OF FORMING COMPOSITE FIBER BUNDLE

[75] Inventor: John W. Hicks, Jr., Fiskdale, Mass.

[73] Assignee: The Bendix Corporation, Detroit, Mich.

[22] Filed: Mar. 14, 1966

[21] Appl. No.: 534,009

Related U.S. Application Data

[63] Continuation-in-part of Ser. No. 178,296, Mar. 8, 1962, Pat. No. 3,240,106.

[52] U.S. Cl............................ 65/4, 65/39, 65/DIG. 7, 350/96
[51] Int. Cl......................... C03c 27/06, C03b 23/20
[58] Field of Search....................... 65/DIG. 7, 4, 39, 65/38

[56] References Cited
UNITED STATES PATENTS

| | | | |
|---|---|---|---|
| 2,992,516 | 7/1961 | Norton | 65/4 X |
| 3,166,395 | 1/1965 | Hicks, Jr. | 65/4 |

*Primary Examiner*—Reuben Epstein
*Attorney*—Stowell & Stowell

EXEMPLARY CLAIM

1. A method of forming a glass fiber device including the steps of: forming a fiber bundle comprising a plurality of parallel fibers, heating said fiber bundle to a working temperature, while at the working temperature forcing the ends of said bundle towards each other while constraining the ends of said bundle from radial movement in a plane normal to the longitudinal axis of said bundle to form a fused bundle of glass fibers having generally parallel ends of generally the original cross-section dimension and an outwardly curved bulbous center section immediately adjacent the ends of the bundle.

4 Claims, 3 Drawing Figures

PATENTED DEC 18 1973

3,779,729

INVENTOR
JOHN W. HICKS, JR.

BY Stowell & Stowell

ATTORNEYS

METHOD OF FORMING COMPOSITE FIBER BUNDLE

This application is a continuation-in-part of my application Ser. No. 178,296, filed Mar. 8, 1962 now U.S. Pat. No. 3,240,106 issued Mar. 15, 1966, entitled Fiber Optical Scanning Device.

This invention relates to a composite fiber device and a method for its manufacture. More particularly, the invention relates to novel fiber devices for the optical and gas handling arts and methods of fabrication. Particularly significant advantages realized by the practice of the present invention are the attainment of a flat focal surface, synonomously, a flat image in optical systems and means for controlling gas flow and atomic and molecular gas concentration.

It is well known in the field of optics that, for example, an object imaged through a conventional glass lens or system of lenses will not form an image of the object on a geometrically flat plane. To illustrate the simplest case of this resulting in a loss of definition, consider a text book-type situation wherein an arrow perpendicular to optical axis or longitudinal axis of a double convex lens is imaged. Optical rays emanating from all points of the arrow strike all points of one of the convex lens surfaces and, after refraction from the lens, form the image. The image, however, is not formed on a single plane normal to the optic axis, rather it is spread somewhat along the axis. Recourse to various textbooks and the optical literature will yield complete explanations for this occurrence. Since it is so well known to workers in this art, further elucidation or elaboration will not be given.

In order to overcome this difficulty, prior workers in the optical art including workers in the more recent fiber optic art have developed various lens systems and while many of these efforts have been more or less successful, in one aspect the present invention yields a relatively inexpensive mode of realizing a flat focal surface, synonomously, a flat image surface using fiber optics.

In the following a novel fiber optic device and its method of fabrication will be described to attain the above-mentioned flat image surface and, in this connection, it will be assumed that the reader is familiar with the basic properties of fiber optics.

Figure 1:
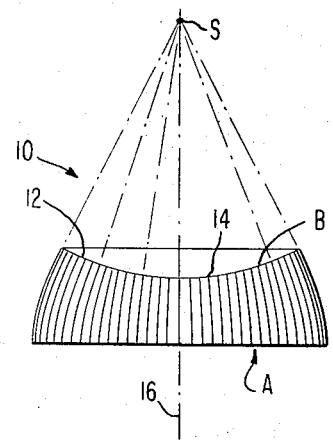
FIG. 1 is a cross-sectional view of a novel fiber element formed in accordance with this invention.

Referring now to FIG. 1, the numeral 10 denotes, generally, a novel fiber device adapted to yield in one aspect a flat image in accordance with this invention. The device is in the general form of an annulus and comprises a plurality of glass cores 12 each surrounded by a cladding 14, also of glass. Each core with its associated cladding defines an optical fiber. As is well-known to workers in the fiber optic art, the cladding glass 14 is a lower index of refraction than the core glass 12. This relationship between the indexes of refraction for the cores and the cladding insures total internal reflection for light rays entering an end of the core, provided, as is well-known to workers in this art, that the entrance angle is not greater, with respect to the longitudinal axis of the fiber end, than a certain critical angle. The solid angle which includes rays of light which will be accepted for total internal reflection is known as the cone of acceptance, again a term well-known and understood by workers in this art.

Still referring to FIG. 1 of the drawings, the numeral 16 denotes the longitudinal axis of the fiber optic device 10 and the letter A denotes the viewing, i.e., image face of the device. It will be observed that the ends of the fiber optic elements 12 immediately adjacent to face A are normal to the plane defined by face A. It will further be observed that at the curved surface B (the other face of the element 10), the ends of the fiber optic elements are, at each point where they meet the surface of B, normal to the surface B at the respective points. This arrangement of the ends of the fiber optic elements at surfaces A and B insures that all light emanating from a light source S will, upon impingement on surface B, be rendered parallel by the fiber optic elements and a perfectly flat image plane will be observed by the viewer at face A. Conversely, light rays parallel to axis 16 impinging upon face A will be imaged at the single point S along the longitudinal axis 16 of the device 10. This is in distinction to the usually encountered situation in conventional optics alluded to, supra, wherein incoming rays which are parallel to the longitudinal optical axis of the lens are not all focused at the so-called focal point of the lens.

Figure 2:
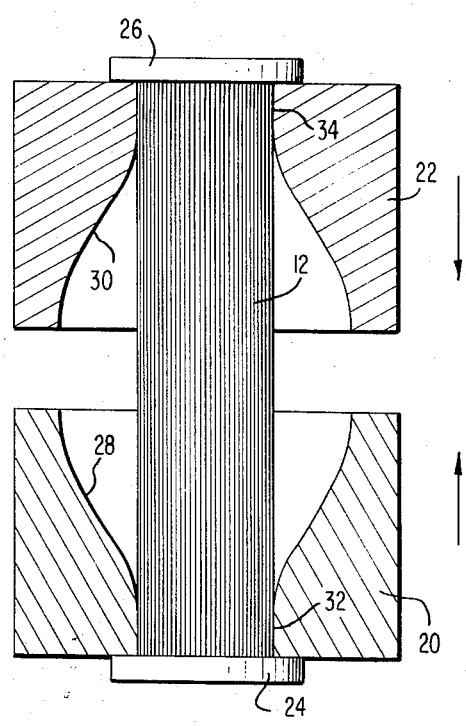
FIG. 2 is a partially schematic cross-sectional view illustrating a process employed in the formation of the element illustrated in FIG. 1.

Referring now to FIG. 2 of the drawings, a description will not be given of a method of forming the fiber device 10 of FIG. 1. The numerals 20 and 22 denote, respectively, halves of a mold of die assembly. The numerals 24 and 26, respectively, denote lower and upper metal plates to which the ends of the fiber bundle, generally circular in cross-section are joined. The numeral 28 denotes a curved surface of revolution in the lower portion of die member 20, while the numeral 30 denotes a corresponding surface for die 22. With the fiber bundle comprising a plurality of longitudinal and parallel extending fiber elements 12 surrounded by cladding 14 are in a heated condition, the dies 20 and 22, together with the end plates 24 and 26, are moved in the direction of the arrows, i.e., they are moved together and this causes the mid-portion of the fiber bundle to bulge radially outwardly within the die cavity, the degree of bulging being limited by the surfaces of the die cavity. The lower and upper ends of the fiber bundle are restrained against radially outward movement by apertures 32 and 34 in the lower and upper die elements, respectively, through which the fiber bundle passes when initially placed in the die assembly. During endwise compression of the fibers in the bundle, the radially outmost members bow outwardly, the radially innermost (central) members increase slightly in diameter, and the radially intermediate members undergo both types of change. It will be noted that during the movement of the dies 24 and 26 towards each other the ends of the fiber bundle which are immediately adjacent the radially outwardly deformed portion of the bundle are prevented from outward radial movement. The bundle portion which becomes bulbous by virtue of the heat and the die movement is thus immediately adjacent the ends of the fiber bundle.

Figure 3:
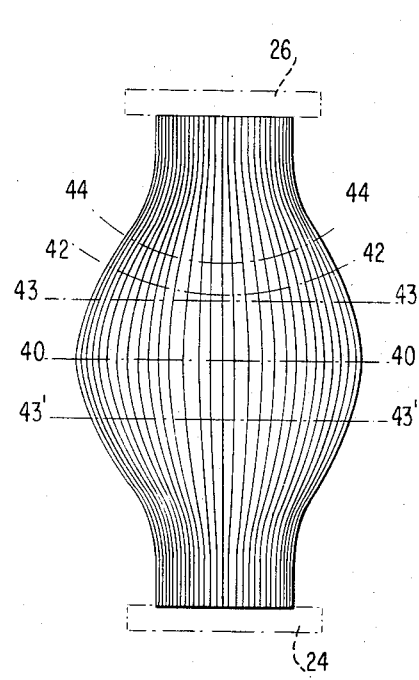
FIG. 3 is a partially schematic cross-sectional view similar to FIG. 2.

Referring now to FIG. 3 of the drawings, the resultant fiber bundle formed at the conclusion of the above-described process is depicted. FIG. 3, therefore, represents the form of the original fiber bundle depicted in FIG. 2 after the removal of the end plates 24 and 26 and the die elements 20 and 22. Let it be assumed that it is desired to fabricate from the bulged fiber optic bundle the fiber optic device 10 shown in FIG. 1. The bundle is now cut midway between its ends, i.e., at the portion of the greatest radius, being denoted by plane 40—40. After this initial cut, a curved cut is made along surface of revolution 42—42. The resultant, i.e., that portion of the bundle of FIG. 3 between the axis 40—40 and 42—42, will obviously yield the device 10 of FIG. 1.

By virtue of the mode of formation of the bundle shown in FIG. 3, it will be observed that each fiber passes through plane 40—40 at precisely a right angle and, further, each fiber element passing through (intersecting) surface 42—42 will, similarly, be normal to this latter surface. It will be apparent that the curvature of the fiber bundles midway of the bundles shown in FIG. 3 will depend upon the shape of the mold or die cavity in proportion to the length and diameter of the fiber bundles shown in FIG. 2 of the drawings.

If desired, a simple magnifying element may be formed by cutting along plane 40—40 of FIG. 3, omitting the cut along surface 42—42 with the ratio between the image and object sizes being the simple ratio of the area of the narrow end of the bundle to the end at surface 40—40. It will further be observed that a concave-convex lens may be made by making cuts along surfaces of revolution 42—42 and 44—44. Cuts 42—42 and its mirror image cut 42'—42' will yield a concave-concave lens. Other useful cuts are illustrated at 43—43 and 43'—43' wherein at least one of the finished surfaces is flat.

For certain applications, the use of the die ensemble of FIG. 2 is not necessary. In such a situation, the die elements 20 and 22 are simply omitted, the bundle heated, and the plates 24 and 26 urged together.

As an example of an actual embodiment of the invention, the following will be useful to workers in this art desirous of practicing it. A fiber optic bundle 3.5 cm. in diameter and 1cm. long was formed from a plurality of fiber optic elements. The cores of the elements were 15 microns in diameter and formed of a glass having an index of refraction of 1.58, and consisting of barium crown (Corning type 573-574). The cladding for each element was 1 micron thick with an index of refraction of 1.48, and consisting of borosilicate glass (Kimble No. EN-1). End plates 24 and 26 were made of metal with a glass mold release coating and were approximately 5 cm × 1 cm. After attachment, the bundle was heated to 1,150° ± 25°F and the end plates moved together a distance of one-fourth inch by means of hydraulic pressure to produce a maximum bulge diameter of 4.2 cm. The cuts 42—42 and 40—40 etc. were made substantially flat and the resulting element was ground to its desired measurment, and thereafter the cut and ground surfaces were polished employing conventional glass grinding and polishing procedures. The resultant device 10 had an effective focal length of 3 cm, i.e., the distance between faces A and S of FIG. 1. When the die elements 20 and 22 are not used, metal bands are placed around the ends of the bundle and perform the same function as apertures 32 and 34 of the dies, i.e., they preclude radial movement of the fiber portions adjacent the bundle ends upon compression.

In the foregoing discussion the fiber bundles have utility primarily in the fiber optical art and each fiber of the bundle consists of a glass core 12 and a glass cladding 14. Where the device is to be used in gas handling art the glass cores 12 are not employed to provide glass tubes through which gases may be pumped or drawn and if pumped or drawn into a high vacuum zone the gases issuing from each tube of the assembly will follow a path or trajectory corresponding to the axis of the opening in the discharge end of each of the tubes. This phenomenon exists as each gas particle, atom or molecule issuing from a tube, having an internal diameter in the order of 10 to 200 microns, into a high vacuum zone will act as a discrete particle in the high vacuum zone thus permitting the gas steams to be concentrated and "focused" at, for example, a point such as point S illustrated in FIG. 1 of the drawings.

Further, while the illustrated embodiments of the invention have dealt with curved surfaces such as 42—42 and 44—44 wherein each tube or rod is cut on a line normal to the surfaces 42—42 or 44—44 the curvilinear surfaces need not be normal to the axis of the fibers except generally where the axis of each fiber is to converge to a single point such as point S of FIG. 1 of the drawings.

I claim:

1. A method of forming a glass fiber device including the steps of: forming a fiber bundle comprising a plurality of parallel fibers, heating said fiber bundle to a working temperature, while at the working temperature forcing the ends of said bundle towards each other while contraining the ends of said bundle from radial movement in a plane normal to the longitudinal axis of said bundle to form a fused bundle of glass fibers having generally parallel ends of generally the original cross-section dimension and an outwardly curved bulbous center section immediately adjacent the ends of the bundle.

2. The method of claim 1, wherein the ends of said bundle are forced together along a common axis.

3. A method of forming a glass fiber optic device including the steps of: forming a glass fiber optic bundle comprising a plurality of parallel optic glass fibers, each surrounded by a glass cladding, the index of refraction of said cladding being less than the index of refraction of the said glass fibers, heating said fiber optic bundle to a glass working temperature, while at the working temperature forcing the ends of said bundle towards each other while constraining the ends of said bundle from radial movement in a plane normal to the longitudinal axis of said bundle to form a fused bundle of glass fibers having generally parallel ends of generally the original cross-sectional dimension and an outwardly curved bulbous center section immediately adjacent the ends of the bundle.

4. The method of claim 3 including the further step of surrounding the mid-portion of said fiber optic bundle before the application of force to the ends thereof with a surface of revolution to thereby limit radial outward movement of the fibers in the longitudinal mid-portion of said bundle.

* * * * *